(12) United States Patent
Liu et al.

(10) Patent No.: US 10,832,454 B1
(45) Date of Patent: Nov. 10, 2020

(54) EDIT PROPAGATION ON RASTER SKETCHES

(71) Applicant: Autodesk, Inc., San Rafael, CA (US)

(72) Inventors: Ning Liu, Toronto (CA); Yang Shen, Jiangsu (CN); Mathieu Lesage, Toronto (CA); Brent Patrick Pittman, Toronto (CA)

(73) Assignee: AUTODESK, INC., San Rafael, CA (US)

( * ) Notice: Subject to any disclaimer, the term of this patent is extended or adjusted under 35 U.S.C. 154(b) by 0 days.

(21) Appl. No.: 16/567,427

(22) Filed: Sep. 11, 2019

(51) Int. Cl.
*G06T 11/20* (2006.01)
*G06T 11/00* (2006.01)
*G06F 3/0488* (2013.01)

(52) U.S. Cl.
CPC ........ *G06T 11/203* (2013.01); *G06F 3/04883* (2013.01); *G06T 11/001* (2013.01); *G06T 2200/24* (2013.01)

(58) Field of Classification Search
None
See application file for complete search history.

(56) References Cited

U.S. PATENT DOCUMENTS

| 2014/0233820 A1* | 8/2014 | Wu | A61B 6/5211 |
| | | | 382/131 |
| 2016/0321825 A1* | 11/2016 | Karasawa | G06T 7/194 |
| 2018/0005343 A1* | 1/2018 | Rhoads | G06T 1/0092 |

OTHER PUBLICATIONS

Ramer, U., "An Iterative Procedure for the Polygonal Approximation of Plane Curves", Computer Graphics and Image Processing, 1972, pp. 244-256, vol. 1, No. 3.
Douglas, D., et al., "Algorithms for the reduction of the number of points required to represent a digitized line or its caricature", The Canadian Cartographer, Dec. 1973, pp. 112-122, vol. 10, No. 2.
Chen, H., et al., "Robust text detection in natural images with edge-enhanced maximally stable extremal regions", 18th IEEE International Conference on Image Processing (ICIP 2011), pp. 1-4.
Suzuki, S., et al., "Topological structural analysis of digitized binary images by border following", Computer Vision, Graphics, and Image Processing, 1985, pp. 32-46, vol. 30.

* cited by examiner

*Primary Examiner* — Frank S Chen
(74) *Attorney, Agent, or Firm* — Gates & Cooper LLP

(57) ABSTRACT

A method, apparatus and system provides the ability to edit a raster sketch. An edit gesture is received and a binary image of the raster sketch is calculated by thresholding. A stroke width transform (SWT) map is calculated and stores a stroke width value for each pixel. An original outside contour of the binary image is calculated and simplified. A propagation cut is determined as a line segment that connects two different points on the simplified contour that separates the simplified outside contour into two parts. The propagation cut is applied to the original outside contour and displayed.

20 Claims, 14 Drawing Sheets

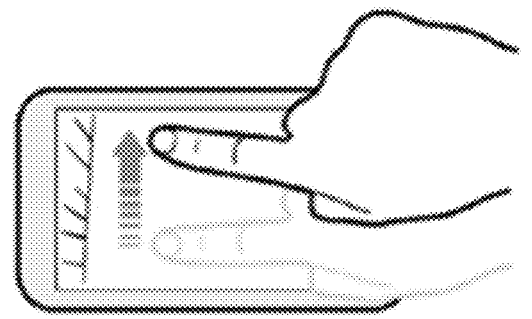
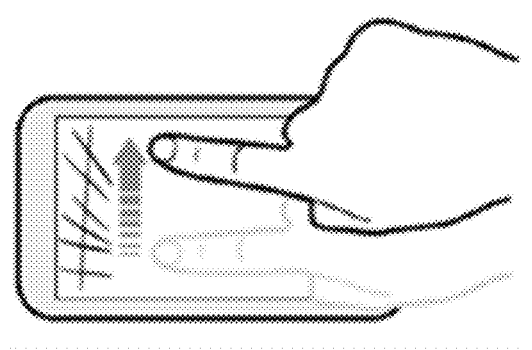
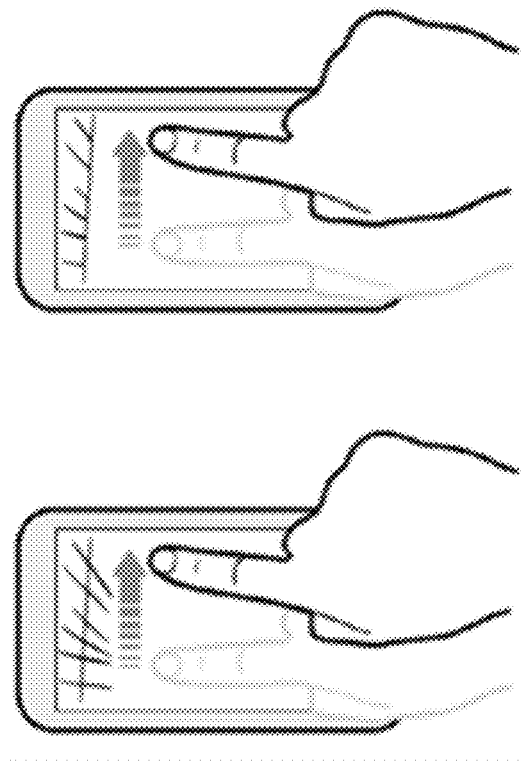
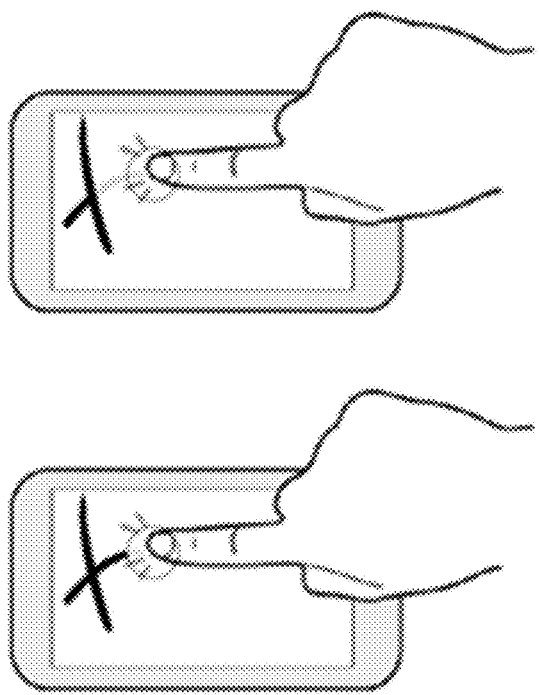
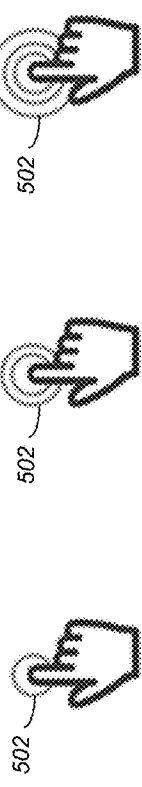
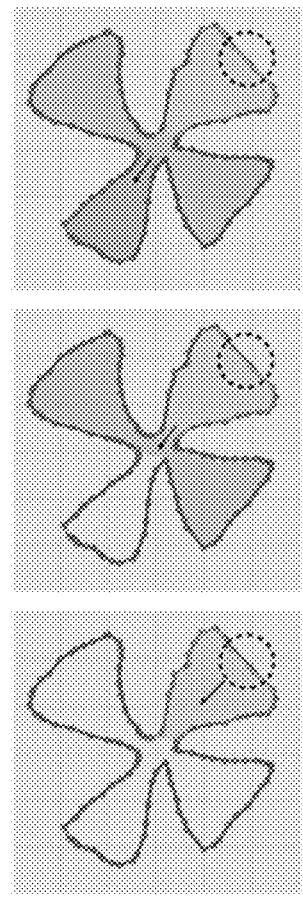
FIG. 4A  FIG. 4B  FIG. 4C  FIG. 4D
FIG. 5A  FIG. 5B  FIG. 5C

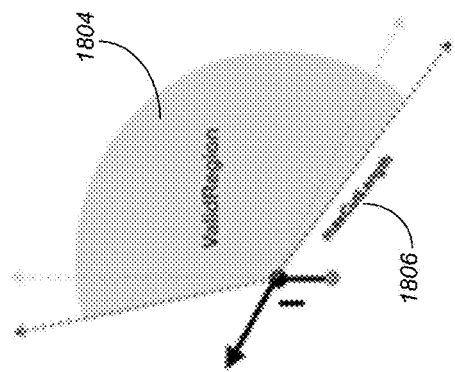
FIG. 18A
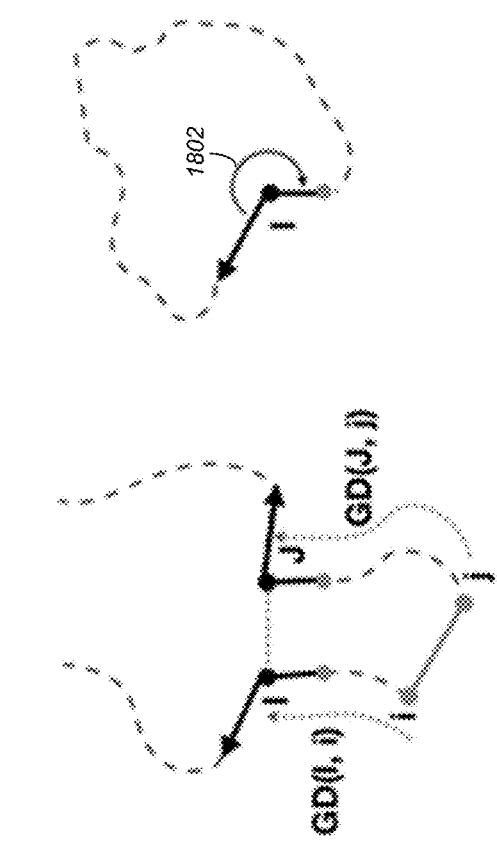
FIG. 18B
FIG. 18C
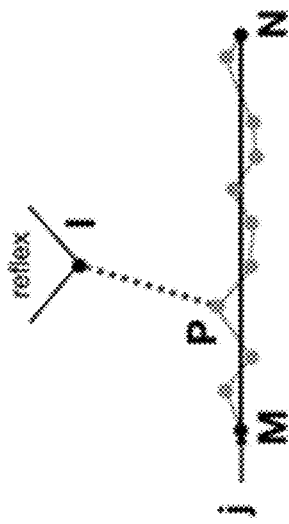
FIG. 19A
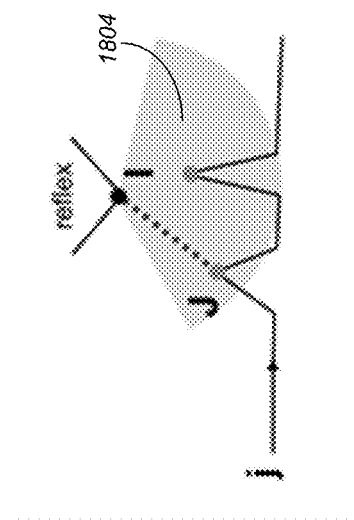
FIG. 19B

EDIT PROPAGATION ON RASTER SKETCHES

BACKGROUND OF THE INVENTION

1. Field of the Invention

The present invention relates generally to raster image editing, two-dimensional (2D) sketching, and image processing, and in particular, to a method, system, apparatus, and article of manufacture for efficiently editing a raster image using edit propagation.

2. Description of the Related Art (Note: This application references a number of different publications as indicated throughout the specification by reference numbers enclosed in brackets, e.g., [x]. A list of these different publications ordered according to these reference numbers can be found below in the section entitled "References." Each of these publications is incorporated by reference herein.)

Pixel-based editing, such as an erasing tool, is among the most frequently used features in sketching applications. Thus, its efficiency is critical to a user's productivity. However, for most touch devices such as cell phones or tablets, editing pixels accurately is not easy. Accordingly, what is needed is an efficient mechanism for editing raster based images in an accurate and desirable manner. To better understand the problems, a more detailed explanation of prior art sketching/editing may be useful.

FIGS. 1A and 1B illustrate the editing of a raster sketch in the prior art. A user has sketched lines 102A-102D (collectively referred to as lines 102). To create smooth lines, users often draw quickly. However, as illustrated, the lines 102 have gone over the desired length and need to be edited. For example, line 102A has intersected with line 102D such that it is desirable to erase portion 104AD of line 102A. Similarly, it is also desirable to erase/remove line segments 104AB, 104BA, 104DA, 104BC, 104CB, 104CD, and 104DC as they extend beyond the intersections with the desired geometry. In the prior art, editing, such line segments, entailed activating an eraser tool, followed by manually performing a stroke operation (represented in FIG. 1A as eraser strokes 106) over the area to be erased. Such a manual eraser operation is a tedious process that is prone to error. For example, FIG. 1B illustrates an error made when conducting an erase operation in the prior art. As illustrated, when conducting the erase operation, the user has accidentally erased the intersection and part of lines 102A and 102B (illustrated by error arrow 108). As a result, the erase operation must be undone, and the user must begin the erase operation again. These problems are exacerbated when the user is performing the editing on a tablet/phone (e.g., where the finger is being used to perform the erase stroke/erase operation).

SUMMARY OF THE INVENTION

Embodiments of the invention provide a simple but effective workflow to make pixel editing easier and faster. Instead of focusing on the pixels being currently edited, embodiments of the invention leverage the shape information to propagate user's edits to a larger semantically reasonable area. This two-dimensional (2D) propagation stops at certain critical cuts, that can be computed by a two-way search along a simplified contour.

In a preprocessing stage, the sketch is thresholded and local regions are clipped. A stroke width transform (SWT) map is computed to obtain width information for each pixel. Next, the most outside contour is extracted from the thresholded sketch and simplified. On the simplified contour, a two-way search is conducted for reflex pairs to locate a propagation cut on the original contour. The process then continues to find the next propagation cut if necessary.

BRIEF DESCRIPTION OF THE DRAWINGS

Referring now to the drawings in which like reference numbers represent corresponding parts throughout:

FIGS. 4A-D illustrate the user interface interaction of edit propagation on touch devices to remove overshot strokes in accordance with one or more embodiments of the invention;

FIGS. 5A-5C illustrate propagation levels that can be connected with pressure in accordance with one or more embodiments of the invention;

FIG. 18A illustrates a two-way search from i and j (utilizing geodesic distance GD) in accordance with one or more embodiments of the invention.

FIG. 18B illustrates the reflex definition based on the eps angle in accordance with one or more embodiments of the invention;

FIG. 18C illustrates a reflex's validation region and the maxCutLength in accordance with one or more embodiments of the invention;

FIG. 19A illustrates when I has an opposed reflex, the closest coherent reflect J is the second cut point in accordance with one or more embodiments of the invention;

FIG. 19B illustrates a case where I doesn't have any coherent reflex and the closest P on the original contour between M and N is selected as the second cut point in accordance with one or more embodiments of the invention;

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Figure 2:
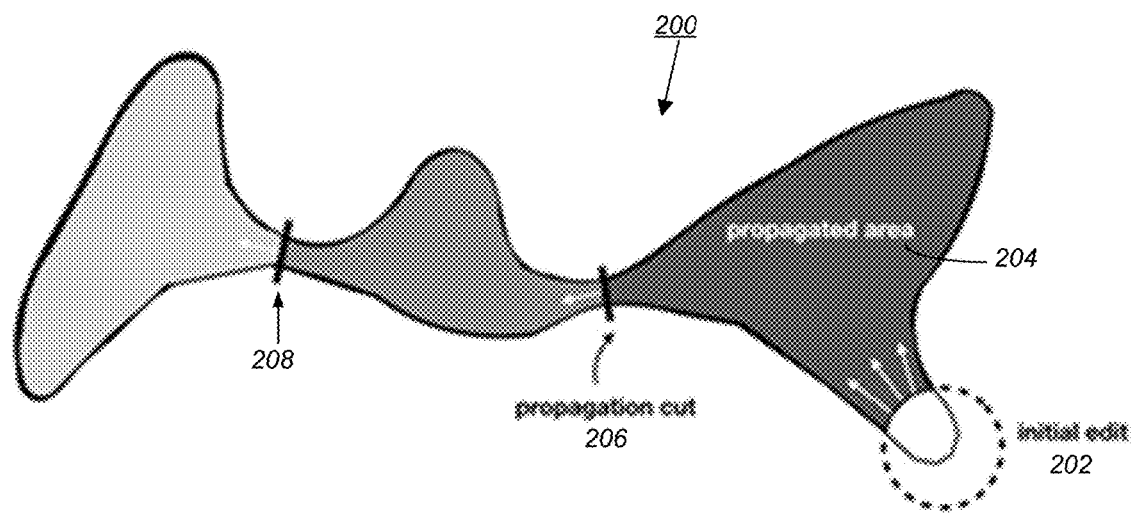
FIG. 2 illustrates an edit propagation process to expand an initial edit to larger areas in accordance with one or more embodiments of the invention.

Given a raster image and a user's initial edit area, embodiments of the invention compute a propagated area and provide a suggestion to the user to apply the same edit to the propagated area. FIG. 2 illustrates an edit propagation process to expand an initial edit to larger areas in accordance with one or more embodiments of the invention. As illustrated, an edit operation is being performed on raster sketch 200. The initial edit 202 is then propagated into propagated area 204 up until the first propagation cut 206, or potentially to the second propagation cut 208. Generally, the propagated area 204 should be semantically meaningful with the user's original edit 202, e.g. representing certain perceivable "parts" of the sketch 200.

Prior art tools mostly rely on color information to perform edit propagation, which limits their usefulness when dealing with strokes or shapes of the same color. Embodiments of the invention leverage shape characteristics of the sketch 200 to bypass this limitation. Starting from an initial edit 202, reasonable propagation cuts 206 and 208 can be found by searching for critical reflex pairs opposed to each other on a simplified contour. Further, an efficient eraser tool that utilized the propagation area provides a unique user experience in sketching software.

User Interface

One obvious benefit of a workflow of embodiments of the invention is that the workflow will significantly speed up the drawing process, by simplifying the repetitive and frequent task of erasing unwanted portions of strokes, or elements from a drawing.

Further, embodiments of the invention can also be applied in scenarios where accurate pixel editing is difficult or tedious to complete. For example, in touch devices, finger tabbing and swiping are common operations. However, due to the physical sizes of human fingers, it's still tough to control edit areas precisely.

Figure 1A:
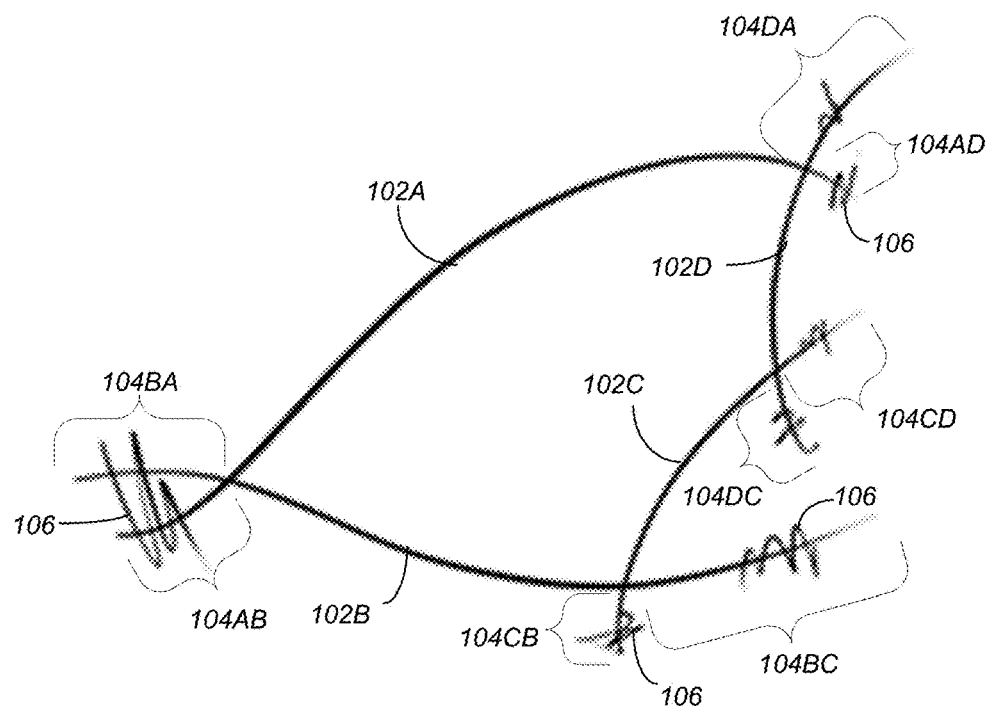
FIGS. 1A and 1B illustrate the editing of a raster sketch in the prior art.
Figure 1B:
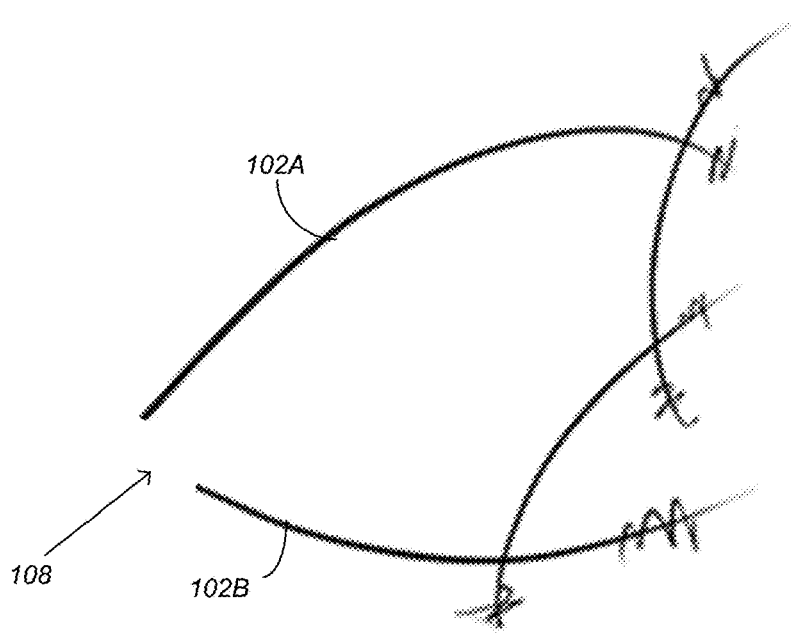
Figure 3A:
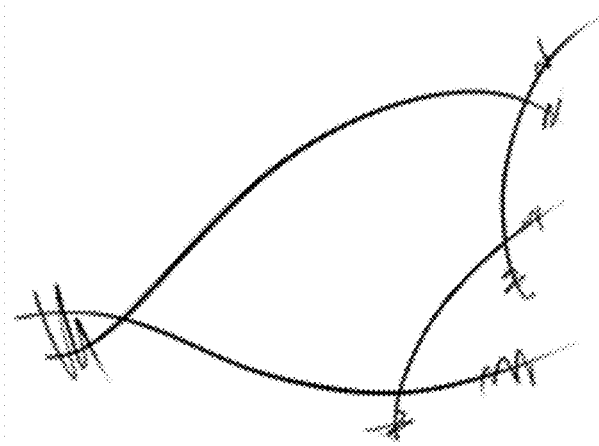
FIGS. 3A-3B illustrate the removal of overshot strokes in accordance with one or more embodiments of the invention.
Figure 3B:
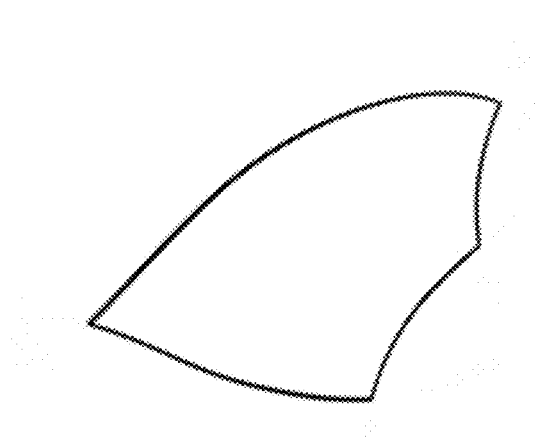

More specifically, artists often stroke fast to make lines smooth, leading to strokes intersecting each other. Sometimes users would like to remove the overshot parts of the strokes shown in FIGS. 1A and 3A to produce the result illustrated in FIG. 3B. Accordingly, FIGS. 3A-3B illustrate the removal of overshot strokes in accordance with one or more embodiments of the invention.

FIGS. 4A-D illustrate the user interface interaction of edit propagation on touch devices to remove overshot strokes in accordance with one or more embodiments of the invention. In this regard, supposing a user would like to erase the stroke to the junction of two crossing strokes, the user has to be very careful to edit the target areas along the stroke path, without over-erasing nearby areas. Fortunately, with edit propagation (of embodiments of the invention) turned on, the user just needs a quick swipe on part of the stroke (as illustrated in FIG. 4A), then the whole stroke is highlighted to be erased to the junction position (as illustrated in FIG. 4B).

This workflow can be even more efficient, by limiting propagation to be only one step from multiple initial edits. For example, a quick swipe gesture (as illustrated in FIG. 4C) erases all unwanted overshot lines instantly in an efficient way (as depicted in FIG. 4D).

Edit propagation can also be designed as a suggestive action through an additional user interface (UI) dimension. FIGS. 5A-5C illustrate propagation levels that can be connected with pressure in accordance with one or more embodiments of the invention. Suppose a user is going to color an object. By varying the touch pressure 502, the user can control how far the edit propagates, where higher pressure guarantees the coloring applied to a larger portion of the object. Thus, the lowest pressure is applied in FIG. 5A and the edit propagates through the first geometric area. However, as additional pressure is applied (as reflected in FIG. 5B), the edit propagates to the two additional geometric areas. Further, as more pressure is applied (as reflected in FIG. 5C), the edit propagates to cover the geometry of the entire shape.

Of particular note is that the workflow/edit propagation does not depend on any path information, which makes embodiments of the invention suitable for scanned paper sketches as well.

Logical Flow

Figure 6:
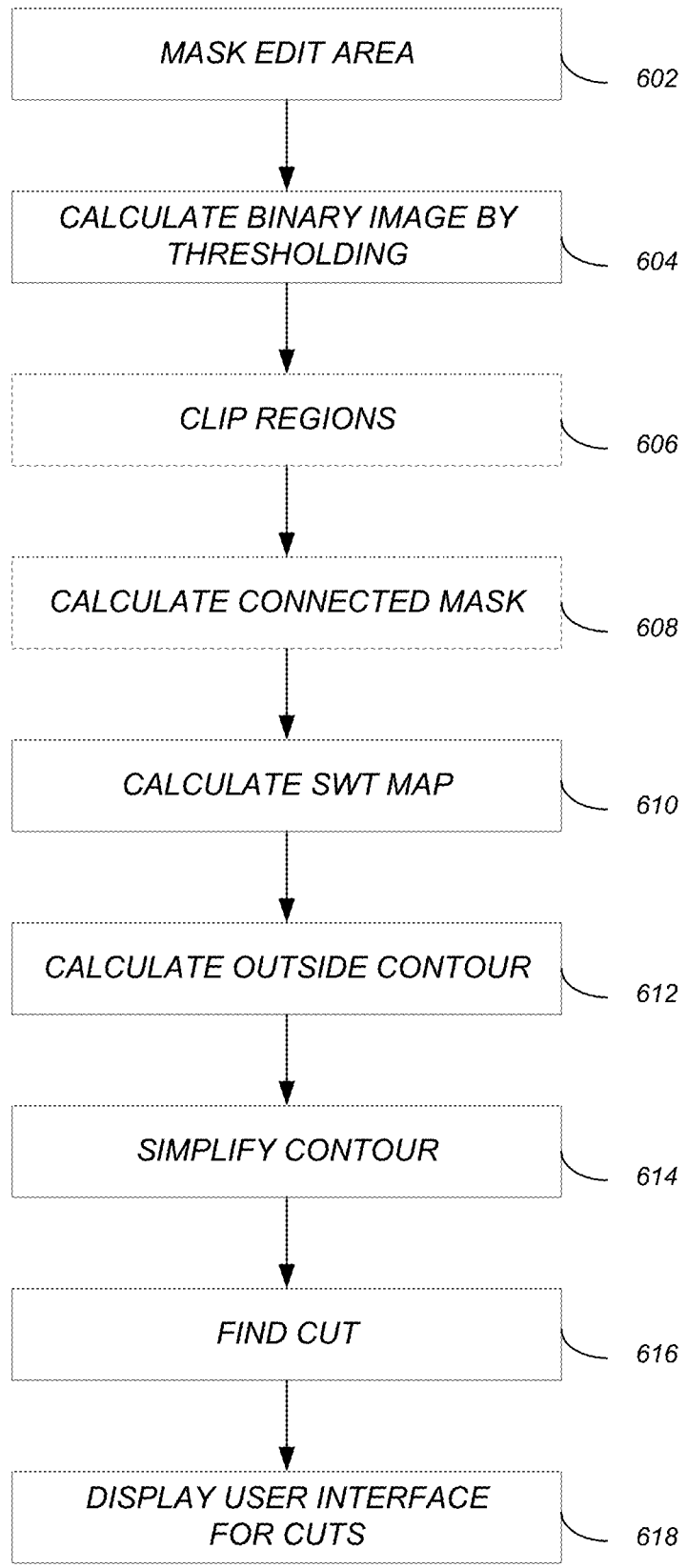
FIG. 6 illustrates the overall logical workflow of a propagation edit process conducting in accordance with one or more embodiments of the invention.

FIG. 6 illustrates the overall logical workflow of a propagation edit process conducting in accordance with one or more embodiments of the invention.

Figure 7:
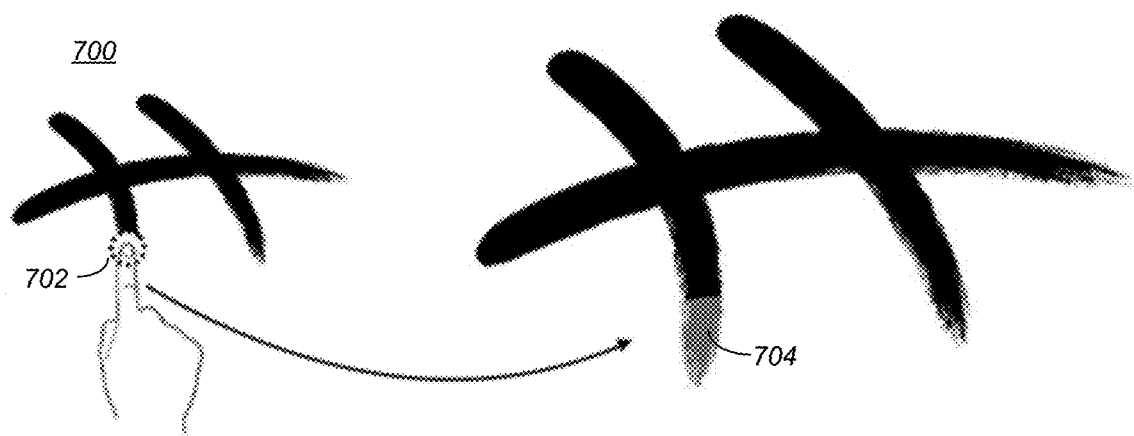
FIG. 7 illustrates the masking performed in accordance with one or more embodiments of the invention.

At step 602, once the raster sketch is acquired, the edit area is masked from input/user interface. FIG. 7 illustrates the masking performed in accordance with one or more embodiments of the invention. As illustrated, the area where the user has touched 702 the original sketch 700 is marked 704 once the user gesture is complete. In other words, upon receipt of an edit gesture, the edit area of the raster sketch is masked based on the edit gesture.

At step 604, a binary image is computed by thresholding. In this regard, the sketch 700 (which is usually input as a raster image) may first be converted to a gray image, and the gray image is then thresholded into/to create a binary image.

Figure 8:
FIG. 8 illustrates a calculated binary image based on thresholding in accordance with one or more embodiments of the invention.

FIG. 8 illustrates a calculated binary image based on thresholding in accordance with one or more embodiments of the invention.

Figure 9A:
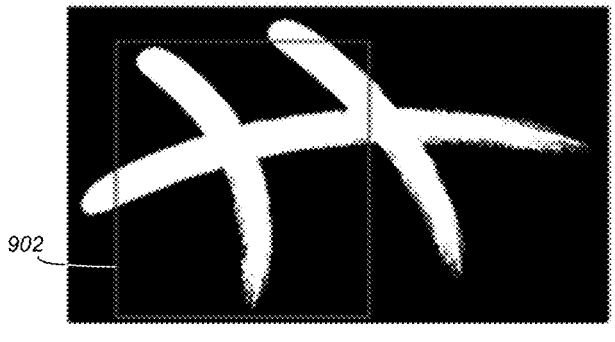
FIG. 9A illustrates a clip region that has been defined on the binary image in accordance with one or more embodiments of the invention.
Figure 9B:
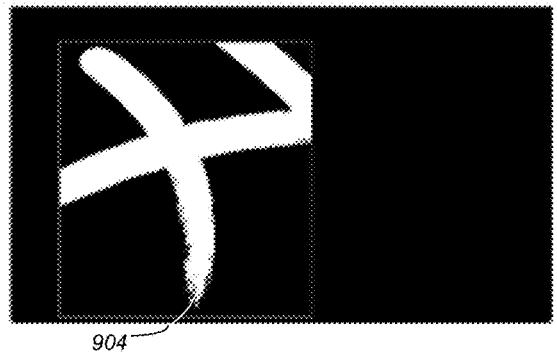
FIG. 9B illustrates the resulting clipped image after clipping the region in FIG. 9A in accordance with one or more embodiments of the invention.

At optional step 606, local window clipping may be performed to reduce the computing region (e.g., by focusing the calculation on the local area around the edit). In this regard, for performance consideration, pixels outside of a clip region may be ignored (e.g., before proceeding to step 610). Thus, a clip region of the raster sketch is defined. The definition (e.g., the size) of the clip region may be dependent on the computational power of the (computing) device. For example, cell phones may require a smaller clip region. The default clip region may be set to be a full screen by the system. FIG. 9A illustrates a clip region 902 that has been defined on the binary image, and FIG. 9B illustrates the resulting clipped image 904 in accordance with one or more embodiments of the invention. In embodiments of the invention, the system may automatically perform the clipping (i.e., without additional input from the user) based on a geometric region (e.g., a rectangular region). Such a clipped area may be defined dynamically based on an analysis of the image.

Figure 10:
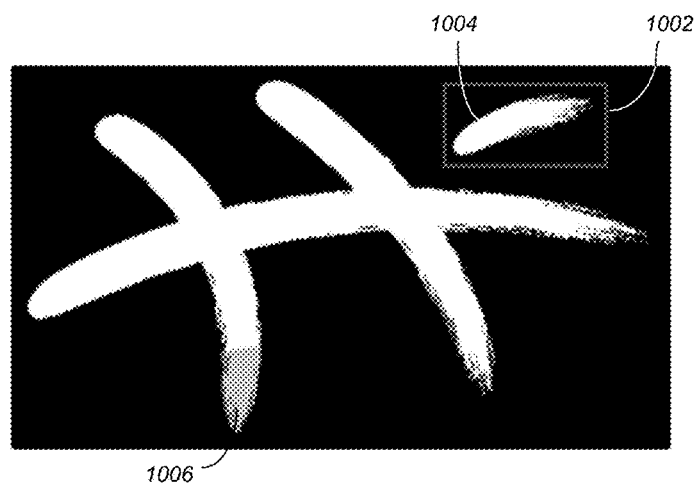
FIG. 10 illustrates a disconnected region containing pixels that will be ignored as they belong to a component that is disconnected from the edit area in accordance with one or more embodiments of the invention.

At optional step 608, a connected mask may be calculated. The mask operates to mask the pixels in the binary image that are disconnected from the edit area. Thus, the calculation of the connected mask reduces the computing region as the only pixels that are considered are those pixels connected to the edit area (because it is pointless to propagate edits to disconnected regions). FIG. 10 illustrates a disconnected region 1002 containing pixels that will be ignored as they belong to a component 1004 that is disconnected from the edit area 1006. Accordingly, a mask may be calculated that identifies the areas/pixels/components that are connected together (and connected to the edit area 1006) and the disconnected pixels/components are masked out. Such a masking step 608 is performed before step 610.

Figure 11:
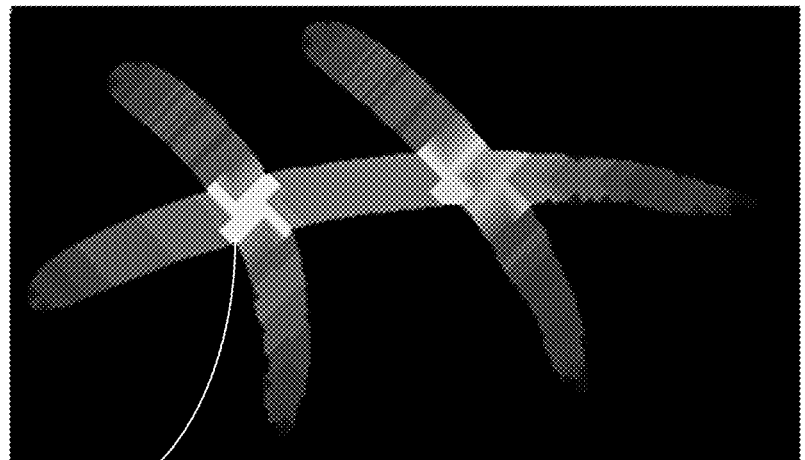
FIG. 11 illustrates an SWT map computed/calculated in accordance with one or more embodiments of the invention.

Once the binary mask (e.g., from step 604) is acquired (and optional clipping and connected mask calculations have been conducted), a stroke width transform (SWT) map may be calculated to extract and store the stroke width for each pixel (in the binary image) at step 610. FIG. 11 illustrates an SWT map computed/calculated in accordance with one or more embodiments of the invention. The width information is to be used later as a search range threshold the find cut step 616. Specifically, for pixels that have not been ignored (i.e., the pixels that have not been clipped/masked out), the stroke width transform map is computed and the stroke width values for arbitrary pixels are stored. In one or more embodiments, the intersecting area tends to have larger values. Further, as illustrated in FIG. 11, the areas that are "hotter" i.e., lighter in color (e.g., area 1102), the larger the width. In view of the above, the SWT identifies the width of the stroke at the pixel. The method in [3] may be utilized to extract the stroke width.

Figure 12:
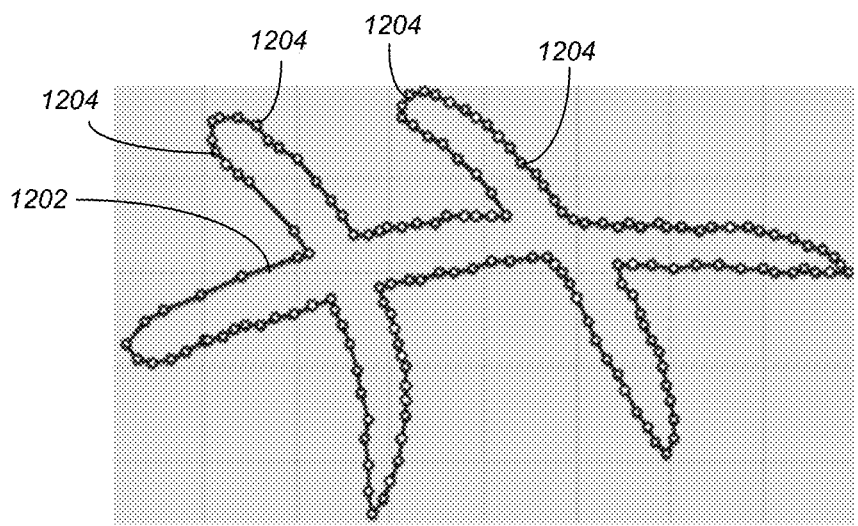
FIG. 12 illustrates a resulting boundary/outside contour that includes dense/a multitude of points in accordance with one or more embodiments of the invention.

At step 612, the most outside contour/boundary (e.g., of the binary image) is calculated (as used herein the most outside contour/boundary may also be referred to as the original outside contour). The contour may be computed starting from (i,j) [4]. As there may be multiple contours embedded together, embodiments of the invention only consider the most outside one/the boundary of the clipped region. In other words, in practice, the sketch may be complex with holes inside strokes. Accordingly, the most outside contour/boundary is computed and the small contours embedded in it are ignored. The output contour contains dense points. FIG. 12 illustrates the resulting boundary/outside contour 1202 that includes dense/a multitude of points 1204 in accordance with one or more embodiments of the invention.

Figure 13:
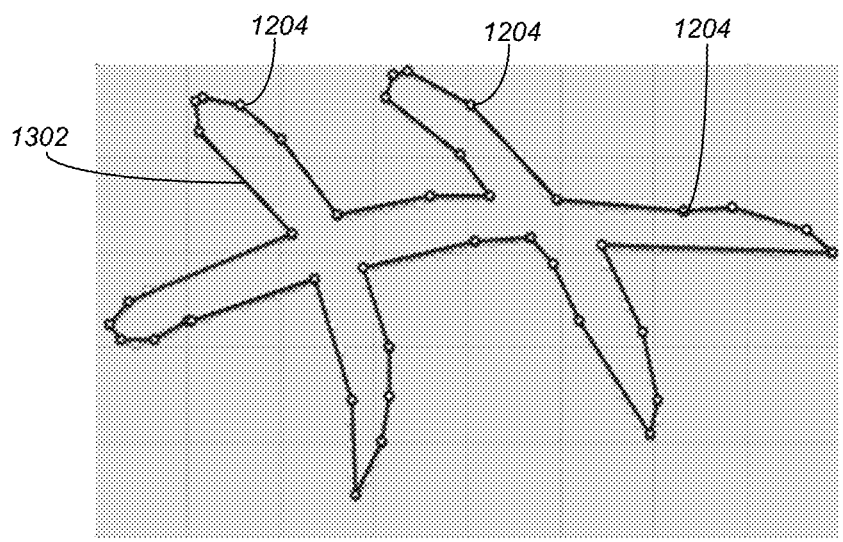
FIG. 13 illustrates a resulting simplified outside contour/boundary with fewer points in accordance with one or more embodiments of the invention.

At step 614, a methodology/algorithm may be applied to simplify the contour/boundary 1202 to reveal the critical points (resulting in a simplified outside contour). In one or more embodiments, the Ramer-Douglas-Peucker (RDP) method [1][2] may be used to reduce points on the curve by removing less important points (i.e., to filter out unimportant/non-critical contour points). One may note that along the RDP process, certain points remain on the contour as the distance threshold gest larger. In one or more embodiments, the remaining points are the candidate locations where propagation should possibly stop (i.e., the reason for simplifying is to reveal the critical points of the contour 1202, which may be potential points for a propagation cut). A carefully chosen distance threshold value according to the size of an overall bounding box (i.e., the bounds the geometry) is sufficient to acquire critical points. In this regard, the RDP methodology may be based on a distance threshold value computed based on a size of a bounding geometry of the binary image. FIG. 13 illustrates the resulting simplified outside contour/boundary 1302 with fewer points 1204. In this regard, the removal of points serves to identify the key/critical points on the contour 1202. In one or more embodiments, such critical points consist of the intersection points between different strokes (e.g., the points that mark the boundaries between the horizontal and vertical strokes). The points remaining after simplification are not newly created points but are points that have been selected/identified from the original points.

At step 616, the propagation cut is determined/acquired/found. In this regard, once a simplified contour 1302 is computed, the computation of the propagation cut can be performed. A propagation cut is basically a line segment connecting two different points on the (simplified outside) contour 1302, separating the contour 1302 into two parts (and wherein the propagation cut is based on the SWT map). In this regard, the concept is to identify the closest reflex pairs. Table A below illustrates the pseudo code for finding the propagation cut in accordance with one or more embodiments of the invention.

TABLE A

FindCut(i, j)
  cuts = [ ]
  while contour is not all visited:
    if I is the closer reflex:
      search from j for reflex K that satisfy:
        K is inside ValidRegion of I
        K is coherent with I in propagation
        K is the first reflex starting from j
      if K exists:
        cuts.append((I, K))
      else K not exist:
        find I's closest segment (M,N)
        find I's closest point P from original
          contour between M and N
        cuts.append((I, P))

Initially, one assumes i and j as the edit boundary on the contour 1302 (i<j). The search proceeds in two directions i→i−1, j→j+1 at the same time, point by point and stops when i way or j way finds a reflex along the segmented contour. As used herein, the determination of "closest" is based on a measurement of the sum of edge lengths starting from i or j.

Figure 14:
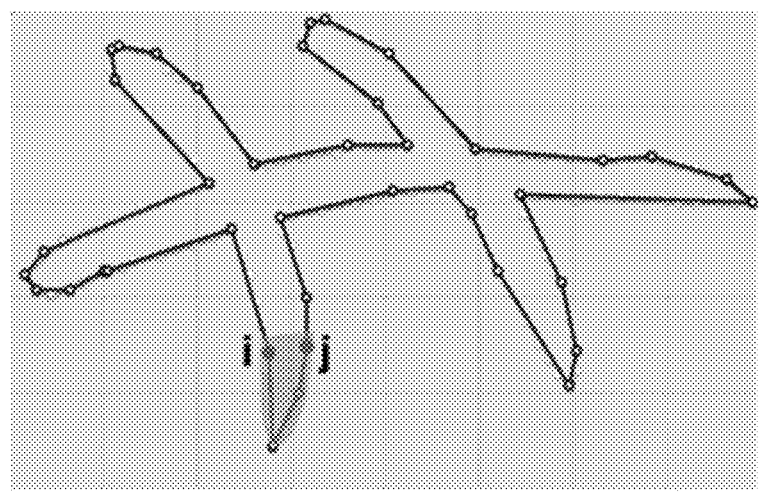
FIG. 14 illustrates the first selection of the starting (i,j) on the simplified contour in accordance with one or more embodiments of the invention.

FIG. 14 illustrates the first selection of the starting (i,j) on the simplified contour 1302. The starting (i,j) are the two contour points on the boundary of the initial edit mask, meaning that i and j are in the initial edit mask, while their adjacently neighboring contour point is not in the initial edit mask. In practice, there may be multiple pairs of intersection points in the initial edit and the system handles each pair of (i,j) as a separate propagation process.

Figure 15:
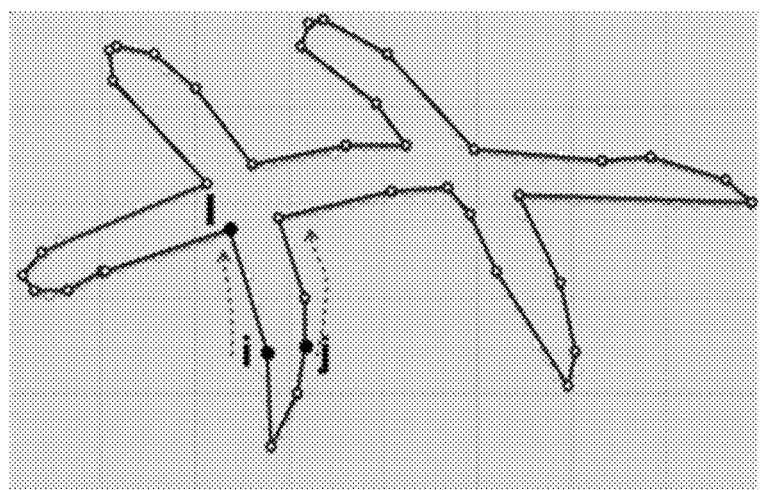
FIG. 15 illustrates the search along the i-way from i and j-way from j for the closer reflex in accordance with one or more embodiments of the invention.

A reflex is a point on the contour whose inner angle is larger than 180+eps degrees, which indicates concavity of the contour at that point. In practice, the eps may be set to be at least 30. As a reflex (I) is supposed to be on a certain propagation cut, embodiments of the invention find the other cut point in j-way to locate the cut. FIG. 15 illustrates the search along the i-way from i and j-way from j for the closer reflex. In FIG. 15, I is the closer/closest reflex. As stated above, "closer" measures the geodesic distance along the contour.

Figure 16:
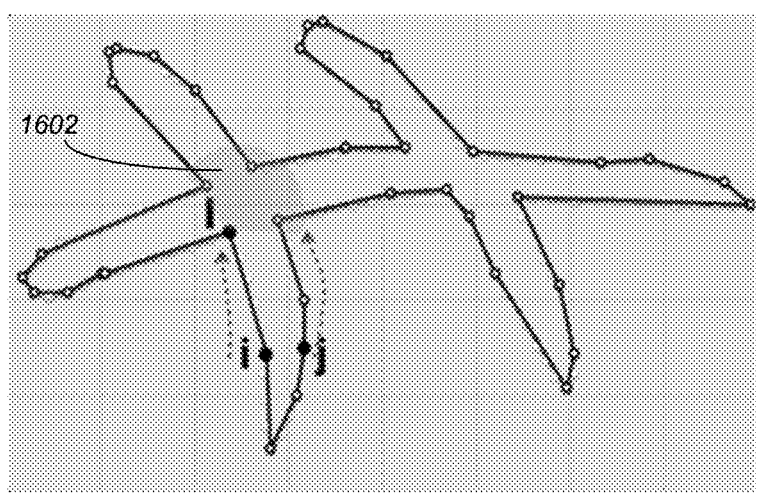
FIG. 16 illustrates a search for the ValidRegion(I) along the j-way trying to find an opposed reflex in accordance with one or more embodiments of the invention.
Figure 17:
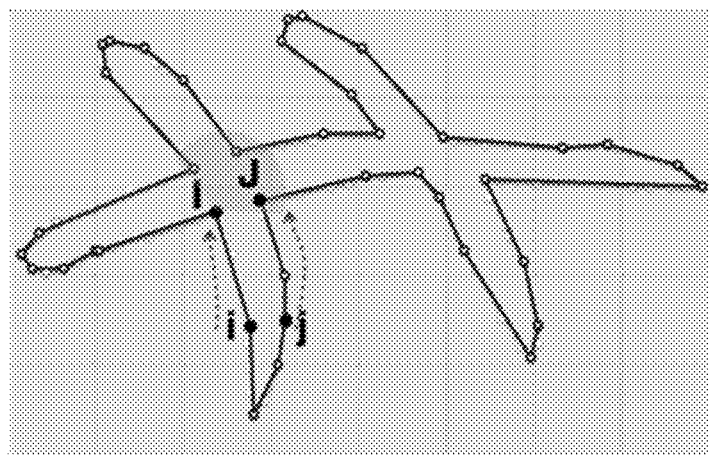
FIG. 17 illustrates that the opposed reflex J has been selected in accordance with one or more embodiments of the invention.

The search is performed in a local neighborhood called ValidRegion(I). FIG. 16 illustrates a search for the ValidRegion(I) 1602 along the j-way trying to find an opposed reflex. The ValidRegion 1602 is constructed by I's adjacent segments and SWT value. In this case, there are multiple candidate reflexes and the first candidate that is coherent is selected. As used herein, coherent means that the geodesic distances i→I and j→J are close within some pre-defined threshold. In one or more embodiments, the function ValidRegion constrains the search space to be along the direction that is opposed to reflex I and in limited a distance maxCutLength (i.e., within a threshold distance). In practice, the direction may be computed by expanding I's two edges by certain degrees (~10) to handle collinear cases and maxCutLength is computed by the stroke width value of SWT(I) by a scale factor of 1.5 (or another predefined scale factor). FIG. 17 illustrates that the opposed reflex J has been selected, because among the three candidate reflexes, J is the closest one along j-way.

In view of the above, one may note that a natural propagation is supposed to push the frontline pixels from i and j in an even way. This means that in one propagation step, the frontline pixel should be a similar geodesic distance from i and j. Accordingly, the coherence may be defined to measure whether the propagation is even:

$$\frac{\|GD(I, i) - GD(J, j)\|}{\min(GD(I, i), GD(J, j))} < \text{maxGDScale}$$

where GD(I, i), GD(J, j) are geodesic distance of I, J to i, j respectively. maxGDScale(<10) is used to control how even the propagation is between i way and j way.

FIG. 18A illustrates a two-way search from i and j (utilizing geodesic distance GD) in accordance with one or more embodiments of the invention. FIG. 18B illustrates the reflex definition based on the eps angle 1802 in accordance with one or more embodiments of the invention. FIG. 18C illustrates a reflex's validation region 1804 and the maxCutLength 1806 in accordance with one or more embodiments of the invention.

When searching for the second point on propagation cut, there are two possible cases. A candidate list may be used to find the cut point:

Push those reflex points in ValidRegion(I) into the candidate list if it is coherent with I in propagation.

If the candidate list is not empty, the second cut point (J) is the closest reflex along the j way in geodesic distance.

If the candidate list is empty, I's closest segment (M, N) on the simplified contour is computed. A search is then conducted for point P from the original contour between M and N, such that P is the closest to I, and P is the second cut point.

Figure 20:
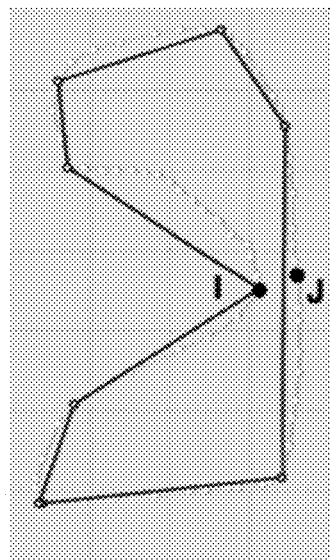
FIG. 20 illustrates the selection of a point J that is closest to reflex I in accordance with one or more embodiments of the invention.

FIG. 19A illustrates when I has an opposed reflex (e.g., within validation region 1804), the closest coherent reflect J is the second cut point. FIG. 19B illustrates a case where I doesn't have any coherent reflex and the closest point P on the original contour between M and N is selected as the second cut point. Thus, in case there is no candidate reflex on j-way, the point on the original contour J is selected, that is closest to reflex I in Euclidean distance. Similar to FIG. 19B, FIG. 20 illustrates the selection of a point J that is closest to reflex I.

Figure 21:
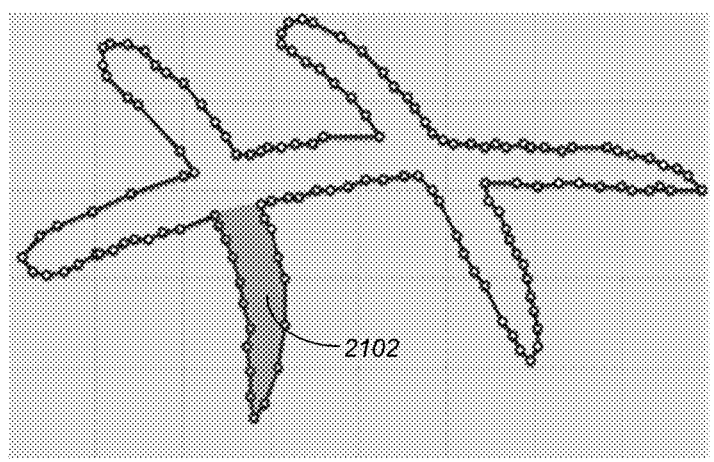
FIG. 21 illustrates that I→J is the first propagation cut in accordance with one or more embodiments of the invention.

FIG. 21 illustrates that I→J is the first propagation cut. Region 2102 is the new edit area after the propagation cut has been completed.

Further to the above, each time a propagation cut is found, the same process starts from the new cut (I, J) until the two-way search meets each other. Thereafter, a cut array contains all the propagate cuts. The cuts are applied to the original contour (without simplification).

In view of the above, the determination of the propagation cut may consist of various steps. In the first step two starting points i and j are selected on/from the simplified outside contour. Searches are done along an i-path on the simplified outside contour from i, and along a j-path on the simplified counter from j. The search is for a reflex with a closer geodesic distance along the simplified outside contour. As described, above, the reflex is a point on the simplified outside contour with an angle that indicates concavity of the simplified outside contour at that point. Thereafter, a search within a valid region of the closer reflex is conducted, along the simplified outside contour, to find an opposed reflex. The reflex and the opposed reflex provide the two different points of the propagation cut. In addition, if the opposed reflex cannot be found, a point on the original outside contour that is closest to the reflex in Euclidean distance is utilized as the opposed reflex. As used herein, the valid region is constructed based on adjacent segments of the closer reflex and stroke width values of the pixels in the adjacent segments. In addition, if the search finds multiple opposed reflexes, the opposed reflex that is selected is the first opposed reflex that is coherent.

At step 618, the propagation cut is applied to the original outside contour and displayed through the UI. The steps 602-618 may then be repeated when the process continues to the next propagation cut, starting from (I,J). In this regard, the displaying may consist of displaying the raster sketch with the applied propagation cut. Such a display may include the sketch with portions erased (based on the propagation cut), or with color propagating through to the propagation cut, or a variety of other edit operations. In one or more embodiments, the pressure of the edit gesture on the computing device determines a size of the propagation area defined by the propagation cut.

Figure 22B:
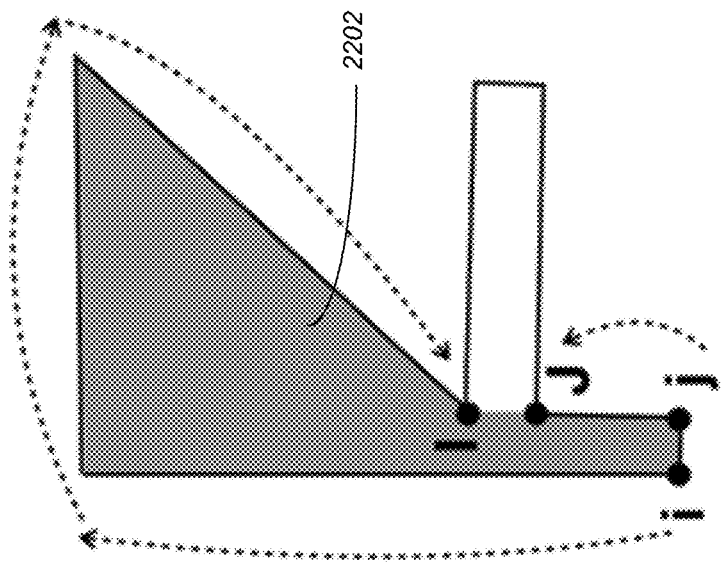
FIGS. 22A-22B illustrate that the use of a larger maxGD Scale may result in uneven propagation in accordance with one or more embodiments of the invention.
Figure 22A:
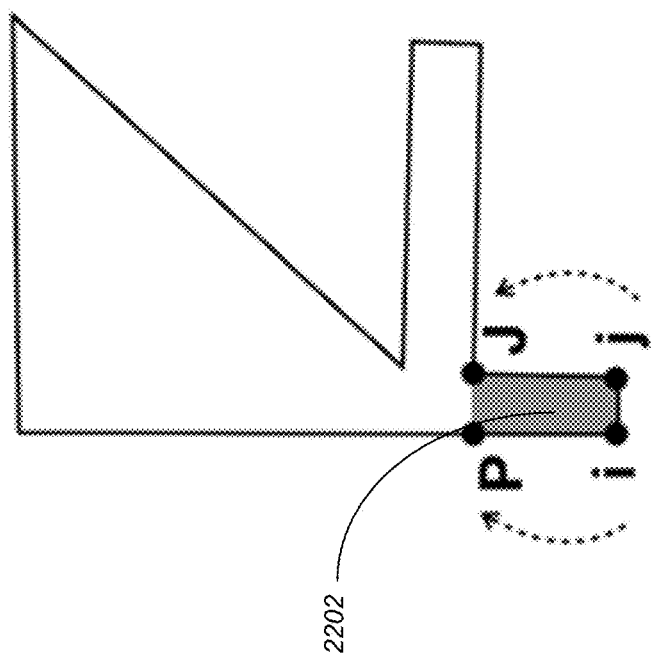

The workflow of FIG. 6 may not generate perfect propagation cuts with improper thresholds. For example, as illustrated in FIGS. 22A-22B, the use of a larger maxGDScale may result in uneven propagation (see areas 2202). In this regard, starting from the same initial positions (i,j), a larger maxGDScale can result in the uneven propagated areas 2202. However, as the purpose of propagation is to provide suggestions rather than mandatory results (and rather than resulting in an error), this is sometimes acceptable. Also, sometimes the second result may prove to be the expected propagation result.

Further to the above, quality may degenerate on over-blurry sketches, as contour computing will become less accurate. However, in practice, such a degeneration does not happen very often as an airbrush technique is rarely used during fast sketching.

In view of the above, most operations in the workflow can be computed locally and efficiently. In the workflow, the time consuming aspect is the stroke width transform. However, as the SWT is a one-time computing, the SWT does not practically become a bottleneck for the whole workflow.

Hardware Environment

Figure 23:
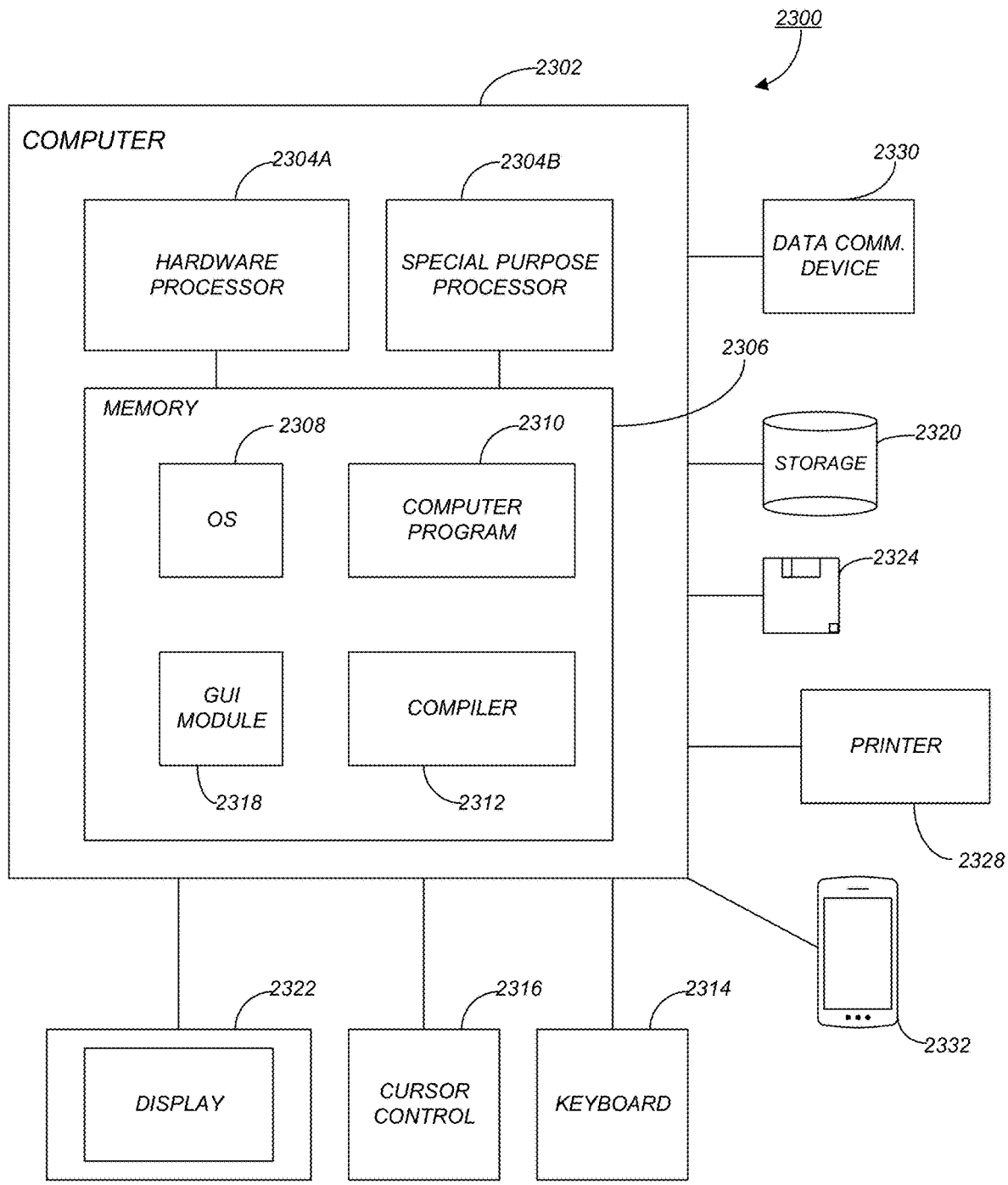
FIG. 23 is an exemplary hardware and software environment used to implement one or more embodiments of the invention.

FIG. 23 is an exemplary hardware and software environment 2300 (referred to as a computer-implemented system and/or computer-implemented method) used to implement one or more embodiments of the invention. The hardware and software environment includes a computer 2302 and may include peripherals. Computer 2302 may be a user/client computer, server computer, or may be a database computer. The computer 2302 comprises a hardware processor 2304A and/or a special purpose hardware processor 2304B (hereinafter alternatively collectively referred to as processor 2304) and a memory 2306, such as random access memory (RAM). The computer 2302 may be coupled to, and/or integrated with, other devices, including input/output (I/O) devices such as a keyboard 2314, a cursor control device 2316 (e.g., a mouse, a pointing device, pen and tablet, touch screen, multi-touch device, etc.) and a printer 2328. In one or more embodiments, computer 2302 may be coupled to, or may comprise, a portable or media viewing/listening device 2332 (e.g., an MP3 player, IPOD, NOOK, portable digital video player, cellular device, personal digital assistant, etc.). In yet another embodiment, the computer 2302 may comprise a multi-touch device, mobile phone, gaming system, internet enabled television, television set top box, or other internet enabled device executing on various platforms and operating systems.

In one embodiment, the computer 2302 operates by the hardware processor 2304A performing instructions defined by the computer program 2310 (e.g., a computer-aided design [CAD] application) under control of an operating system 2308. The computer program 2310 and/or the operating system 2308 may be stored in the memory 2306 and may interface with the user and/or other devices to accept input and commands and, based on such input and commands and the instructions defined by the computer program 2310 and operating system 2308, to provide output and results.

Output/results may be presented on the display 2322 or provided to another device for presentation or further processing or action. In one embodiment, the display 2322 comprises a liquid crystal display (LCD) having a plurality of separately addressable liquid crystals. Alternatively, the display 2322 may comprise a light emitting diode (LED) display having clusters of red, green and blue diodes driven together to form full-color pixels. Each liquid crystal or pixel of the display 2322 changes to an opaque or translucent state to form a part of the image on the display in response to the data or information generated by the processor 2304 from the application of the instructions of the computer program 2310 and/or operating system 2308 to the input and commands. The image may be provided through a graphical user interface (GUI) module 2318. Although the GUI module 2318 is depicted as a separate module, the instructions performing the GUI functions can be resident or distributed in the operating system 2308, the computer program 2310, or implemented with special purpose memory and processors.

In one or more embodiments, the display 2322 is integrated with/into the computer 2302 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD, SURFACE Devices, etc.), portable/handheld game/music/video player/console devices (e.g., IPOD TOUCH, MP3 players, NINTENDO SWITHC, PLAYSTATION PORTABLE, etc.), touch tables, and walls (e.g., where an image is projected through acrylic and/or glass, and the image is then backlit with LEDs).

Some or all of the operations performed by the computer 2302 according to the computer program 2310 instructions may be implemented in a special purpose processor 2304B. In this embodiment, some or all of the computer program 2310 instructions may be implemented via firmware instructions stored in a read only memory (ROM), a programmable read only memory (PROM) or flash memory within the special purpose processor 2304B or in memory 2306. The special purpose processor 2304B may also be hardwired through circuit design to perform some or all of the operations to implement the present invention. Further, the special purpose processor 2304B may be a hybrid processor, which includes dedicated circuitry for performing a subset of functions, and other circuits for performing more general functions such as responding to computer program 2310 instructions. In one embodiment, the special purpose processor 2304B is an application specific integrated circuit (ASIC).

The computer 2302 may also implement a compiler 2312 that allows an application or computer program 2310 written in a programming language such as C, C++, Assembly, SQL, PYTHON, PROLOG, MATLAB, RUBY, RAILS, HASKELL, or other language to be translated into processor 2304 readable code. Alternatively, the compiler 2312 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 2310 accesses and manipulates data accepted from I/O devices and stored in the memory 2306 of the computer 2302 using the relationships and logic that were generated using the compiler 2312.

The computer 2302 also optionally comprises an external communication device such as a modem, satellite link, Ethernet card, or other device for accepting input from, and providing output to, other computers 2302.

In one embodiment, instructions implementing the operating system 2308, the computer program 2310, and the compiler 2312 are tangibly embodied in a non-transitory computer-readable medium, e.g., data storage device 2320, which could include one or more fixed or removable data storage devices, such as a zip drive, floppy disc drive 2324, hard drive, CD-ROM drive, tape drive, etc. Further, the operating system 2308 and the computer program 2310 are comprised of computer program 2310 instructions which, when accessed, read and executed by the computer 2302, cause the computer 2302 to perform the steps necessary to implement and/or use the present invention or to load the program of instructions into a memory 2306, thus creating a special purpose data structure causing the computer 2302 to operate as a specially programmed computer executing the method steps described herein. Computer program 2310 and/or operating instructions may also be tangibly embodied in memory 2306 and/or data communications devices 2330, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 2302.

Figure 24:
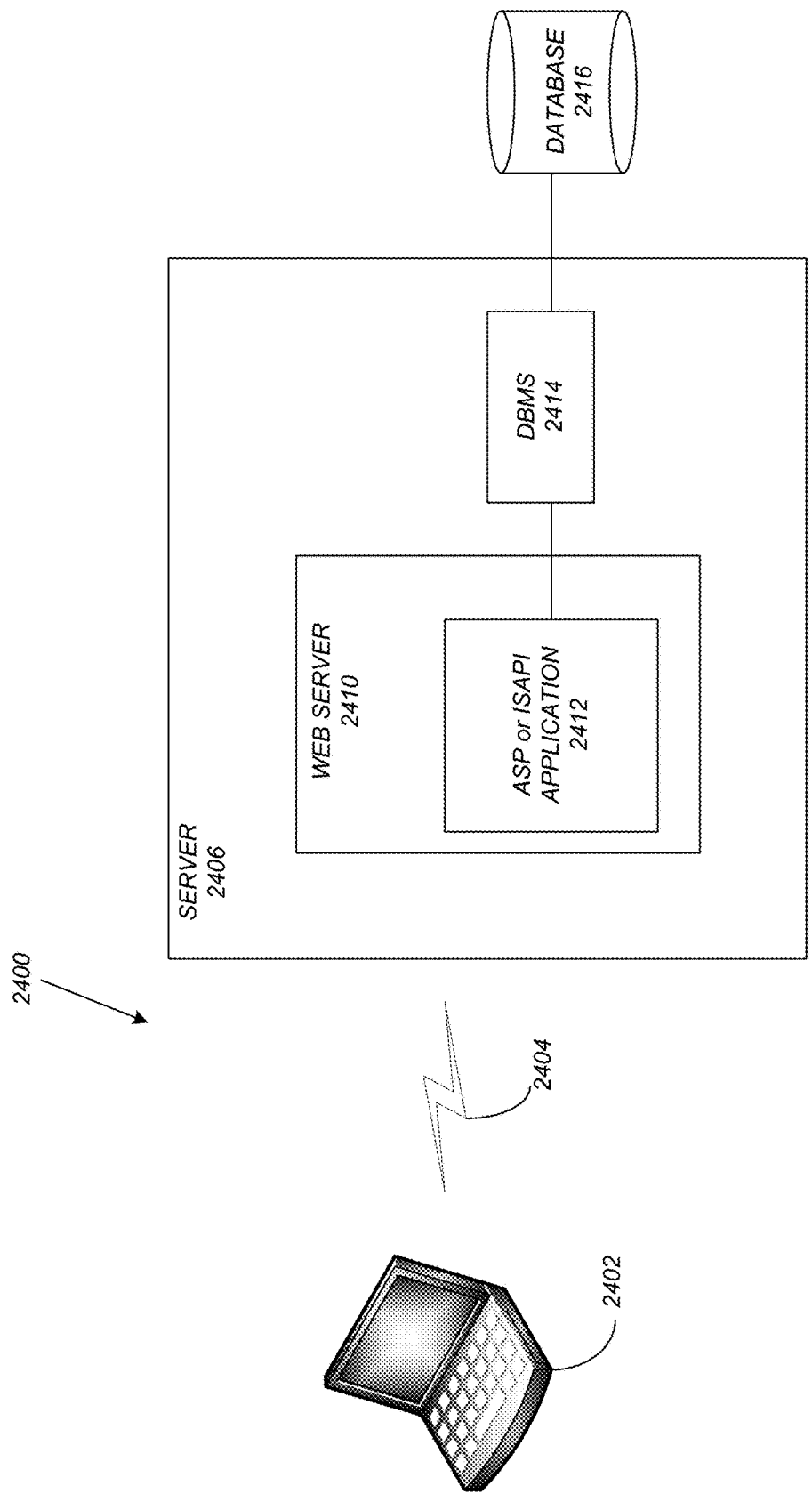
FIG. 24 schematically illustrates a typical distributed/cloud-based computer system in accordance with one or more embodiments of the invention.

FIG. 24 schematically illustrates a typical distributed/cloud-based computer system 2400 using a network 2404 to connect client computers 2402 to server computers 2406. A typical combination of resources may include a network 2404 comprising the Internet, LANs (local area networks), WANs (wide area networks), SNA (systems network architecture) networks, or the like, clients 2402 that are personal computers or workstations (as set forth in FIG. 23), and servers 2406 that are personal computers, workstations, minicomputers, or mainframes (as set forth in FIG. 23). However, it may be noted that different networks such as a cellular network (e.g., GSM [global system for mobile communications] or otherwise), a satellite based network, or any other type of network may be used to connect clients 2402 and servers 2406 in accordance with embodiments of the invention.

A network 2404 such as the Internet connects clients 2402 to server computers 2406. Network 2404 may utilize ethernet, coaxial cable, wireless communications, radio frequency (RF), etc. to connect and provide the communication between clients 2402 and servers 2406. Further, in a cloud-based computing system, resources (e.g., storage, processors, applications, memory, infrastructure, etc.) in clients 2402 and server computers 2406 may be shared by clients 2402, server computers 2406, and users across one or more networks. Resources may be shared by multiple users and can be dynamically reallocated per demand. In this regard, cloud computing may be referred to as a model for enabling access to a shared pool of configurable computing resources.

Clients 2402 may execute a client application or web browser and communicate with server computers 2406 executing web servers 2410. Such a web browser is typically a program such as MICROSOFT INTERNET EXPLORER/EDGE, MOZILLA FIREFOX, OPERA, APPLE SAFARI, GOOGLE CHROME, etc. Further, the software executing on clients 2402 may be downloaded from server computer 2406 to client computers 2402 and installed as a plug-in or ACTIVEX control of a web browser. Accordingly, clients 2402 may utilize ACTIVEX components/component object model (COM) or distributed COM (DCOM) components to provide a user interface on a display of client 2402. The web server 2410 is typically a program such as MICROSOFT'S INTERNET INFORMATION SERVER.

Web server 2410 may host an Active Server Page (ASP) or Internet Server Application Programming Interface (ISAPI) application 2412, which may be executing scripts. The scripts invoke objects that execute business logic (referred to as business objects). The business objects then manipulate data in database 2416 through a database management system (DBMS) 2414. Alternatively, database 2416 may be part of, or connected directly to, client 2402 instead of communicating/obtaining the information from database 2416 across network 2404. When a developer encapsulates the business functionality into objects, the system may be referred to as a component object model (COM) system. Accordingly, the scripts executing on web server 2410 (and/or application 2412) invoke COM objects that implement the business logic. Further, server 2406 may utilize MICROSOFT'S TRANSACTION SERVER (MTS) to access required data stored in database 2416 via an interface such as ADO (Active Data Objects), OLE DB (Object Linking and Embedding DataBase), or ODBC (Open DataBase Connectivity).

Generally, these components 2400-2416 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 2402 and 2406 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 2402 and 2406. Embodiments of the invention are implemented as a software/CAD application on a client 2402 or server computer 2406. Further, as described above, the client 2402 or server computer 2406 may comprise a thin client device or a portable device that has a multi-touch-based display.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, standalone personal computer, tablet device, handheld device, or cellular device could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES

[1]. Urs Ramer, "An iterative procedure for the polygonal approximation of plane curves", Computer Graphics and Image Processing, 1(3), 244-256, 1972.
[2]. David Douglas & Thomas Peucker, "Algorithms for the reduction of the number of points required to represent a digitized line or its caricature", The Canadian Cartographer 10(2), 112-122, 1973.

[3]. Chen, Huizhong and Tsai, Sam S and Schroth, Georg and Chen, David M and Grzeszczuk, Radek and Girod, Bernd, "Robust text detection in natural images with edge-enhanced maximally stable extremal regions", 18th IEEE International Conference on Image Processing (ICIP 2011).

[4]. Suzuki, Satoshi and Kellchi Abe, "Topological structural analysis of digitized binary images by border following", Computer vision, graphics, and image processing, N,32-46 (1985)

What is claimed is:

1. A computer-implemented method for editing a raster sketch, comprising:
    acquiring, in a computing device, the raster sketch;
    receiving, in the computing device, an edit gesture;
    masking, via the computing device, an edit area of the raster sketch based on the edit gesture;
    calculating, via the computing device, a binary image of the raster sketch by thresholding;
    calculating, via the computing device, a stroke width transform (SWT) map that stores a stroke width value for each pixel in the binary image;
    calculating, via the computing device, an original outside contour of the binary image;
    simplifying, via the computing device, the original outside contour resulting in a simplified outside contour;
    determining, via the computing device, a propagation cut, wherein the propagation cut comprises a line segment that connects two different points on the simplified outside contour that separates the simplified outside contour into two parts, wherein the propagation cut is based on the SWT map;
    applying, via the computing device, the propagation cut to the original outside contour; and
    displaying, via the computing device, the raster sketch with the applied propagation cut.

2. The computer-implemented method of claim 1, wherein the calculating the binary image comprises:
    converting the raster sketch to a gray image; and
    thresholding the gray image to create the binary image.

3. The computer-implemented method of claim 1, further comprising:
    defining a clip region of the raster sketch, wherein the defining is dependent on a computational power of the computing device; and
    ignoring the pixels outside of the clip region before calculating the SWT map.

4. The computer-implemented method of claim 1, further comprising:
    calculating a connected mask that masks the pixels in the binary image that are disconnected from the edit area, wherein the calculating is performed before calculating the SWT map.

5. The computer-implemented method of claim 1, wherein the simplifying comprises utilizing a Ramer-Douglas-Peucker (RDP) methodology to filter out non-critical points.

6. The computer-implemented method of claim 5, wherein the RDP methodology is based on a distance threshold value computed based on a size of a bounding geometry of the binary image.

7. The computer-implemented method of claim 1, wherein the determining the propagation cut comprises:
    selecting two starting points i and j on the simplified outside contour;
    searching along an i-path on the simplified outside contour from i and along a j-path on the simplified outside contour from j, for a reflex with a closer geodesic distance along the simplified outside contour, wherein the reflex comprises a point on the simplified outside contour with an angle that indicates concavity of the simplified outside contour at that point; and
    searching within a valid region of the closer reflex, along the simplified outside contour, to find an opposed reflex, wherein the reflex and the opposed reflex comprise the two different points of the propagation cut, wherein if the opposed reflex cannot be found, a point on the original outside contour that is closest to the reflex in Euclidean distance is utilized as the opposed reflex.

8. The computer-implemented method of claim 7, wherein the valid region is constructed based on adjacent segments of the closer reflex and stroke width values of the pixels in the adjacent segments.

9. The computer-implemented method of claim 7, wherein:
    the searching finds multiple opposed reflexes;
    the opposed reflex selected is the first opposed reflex of the multiple opposed reflexes that is coherent.

10. The computer-implemented method of claim 1, wherein a pressure of the edit gesture on the computing device determines a size of a propagation area defined by the propagation cut.

11. A computer-implemented system for editing a raster sketch, comprising:
    (a) a computing device having a memory;
    (b) a processor executing on the computer;
    (c) the memory storing an application that is executed by the processor, wherein the application causes the processor to:
        (i) acquire the raster sketch;
        (ii) receive an edit gesture;
        (iii) mask an edit area of the raster sketch based on the edit gesture;
        (iv) calculate a binary image of the raster sketch by thresholding;
        (v) calculate a stroke width transform (SWT) map that stores a stroke width value for each pixel in the binary image;
        (vi) calculate an original outside contour of the binary image;
        (vii) simplify the original outside contour resulting in a simplified outside contour;
        (viii) determine a propagation cut, wherein the propagation cut comprises a line segment that connects two different points on the simplified outside contour that separates the simplified outside contour into two parts, wherein the propagation cut is based on the SWT map;
        (ix) apply the propagation cut to the original outside contour; and
        (x) display the raster sketch with the applied propagation cut.

12. The computer-implemented system of claim 11, wherein the processor calculates the binary image by:
    converting the raster sketch to a gray image; and
    thresholding the gray image to create the binary image.

13. The computer-implemented system of claim 11, wherein the processor further:
    defines a clip region of the raster sketch, wherein the defining is dependent on a computational power of the computing device; and
    ignores the pixels outside of the clip region before calculating the SWT map.

14. The computer-implemented system of claim 11, wherein the processor further:
   calculates a connected mask that masks the pixels in the binary image that are disconnected from the edit area, wherein the calculating is performed before calculating the SWT map.

15. The computer-implemented system of claim 11, wherein the processor simplifies by utilizing a Ramer-Douglas-Peucker (RDP) methodology to filter out non-critical points.

16. The computer-implemented system of claim 15, wherein the RDP methodology is based on a distance threshold value computed based on a size of a bounding geometry of the binary image.

17. The computer-implemented system of claim 11, wherein the processor determines the propagation cut by:
   selecting two starting points i and j on the simplified outside contour;
   searching along an i-path on the simplified outside contour from i and along a j-path on the simplified outside contour from j, for a reflex with a closer geodesic distance along the simplified outside contour, wherein the reflex comprises a point on the simplified outside contour with an angle that indicates concavity of the simplified outside contour at that point; and
   searching within a valid region of the closer reflex, along the simplified outside contour, to find an opposed reflex, wherein the reflex and the opposed reflex comprise the two different points of the propagation cut, wherein if the opposed reflex cannot be found, a point on the original outside contour that is closest to the reflex in Euclidean distance is utilized as the opposed reflex.

18. The computer-implemented system of claim 17, wherein the valid region is constructed based on adjacent segments of the closer reflex and stroke width values of the pixels in the adjacent segments.

19. The computer-implemented system of claim 17, wherein:
   the searching finds multiple opposed reflexes;
   the opposed reflex selected is the first opposed reflex of the multiple opposed reflexes that is coherent.

20. The computer-implemented system of claim 11, wherein a pressure of the edit gesture on the computing device determines a size of a propagation area defined by the propagation cut.

* * * * *